(12) United States Patent
Kocher et al.

(10) Patent No.: US 6,381,699 B2
(45) Date of Patent: *Apr. 30, 2002

(54) LEAK-RESISTANT CRYPTOGRAPHIC METHOD AND APPARATUS

(75) Inventors: Paul C. Kocher; Joshua M. Jaffe, both of San Francisco, CA (US)

(73) Assignee: Cryptography Research, Inc., San Francisco, CA (US)

(*) Notice: Subject to any disclaimer, the term of this patent is extended or adjusted under 35 U.S.C. 154(b) by 0 days.

(21) Appl. No.: 09/737,182

(22) Filed: Dec. 13, 2000

Related U.S. Application Data

(62) Division of application No. 09/224,682, filed on Dec. 31, 1998, now Pat. No. 6,304,658.
(60) Provisional application No. 60/089,529, filed on Jun. 15, 1998, and provisional application No. 60/070,344, filed on Jan. 2, 1998.

(51) Int. Cl.$^7$ .............................. H04L 9/10; G06F 1/26

(52) U.S. Cl. ...................... 713/172; 713/174; 713/340; 705/65

(58) Field of Search ................................ 713/172, 174, 713/176, 340; 705/65, 75, 76; 380/29, 30

(56) References Cited

U.S. PATENT DOCUMENTS

| | | | |
|---|---|---|---|
| 4,200,770 A | 4/1980 | Hellman et al. ............... | 178/22 |
| 4,405,829 A | 9/1983 | Rivest et al. ............... | 178/22.1 |
| 4,759,063 A | 7/1988 | Chaum ......................... | 380/30 |
| 4,799,258 A | 1/1989 | Davies ......................... | 380/21 |
| 5,136,646 A | 8/1992 | Haber et al. ................... | 380/49 |
| 5,401,950 A | 3/1995 | Yoshida ...................... | 235/487 |
| 5,546,463 A | 8/1996 | Caputo et al. ................. | 380/25 |
| 5,663,896 A | 9/1997 | Aucsmith ............... | 395/187.01 |
| 5,848,159 A | 12/1998 | Collins et al. ................ | 380/30 |
| 5,991,415 A | 11/1999 | Shamir ......................... | 380/30 |

OTHER PUBLICATIONS

RSA Data Security, RSAREF Cryptographic Toolkit Source Code, File R_Random.C, available from ftp://ftp.rsa.com.
"Security Requirements for Cryptographic Modules," Federal Information Processing Standards Publication (FIPS PUB) 140–1, U.S. Department of Commerce, National Institute of Standards and Technology, Jan. 1994.
M. Bellare et al., "Incremental Cryptography: The Case of Hashing and Signing" in: Desmedt, Y., Advances in Cryptology—Crypto 94 Proceedings (Berlin, Springer, 1994) pp. 216–233.
Paul C. Kocher, "Timing Attacks on Implementations of Diffie–Hellman, RSA, DSS, and Other Systems," in Koblitz, N., Advances in Cryptography—Crypto '96 (Berlin, Springer, 1996), pp. 104–113.
H. Krawczyk et al., "HMAC: Keyed–Hashing for Message Authentication," Network Working Group Request for Comments RFC 2104, Feb. 1997.

(List continued on next page.)

Primary Examiner—Thomas R. Peeso
Assistant Examiner—Justin T. Darrow
(74) Attorney, Agent, or Firm—Joseph Yang; Skadden, Arps, Slate, Meagher & Flom LLP

(57) ABSTRACT

The present invention provides a method and apparatus for securing cryptographic devices against attacks involving external monitoring and analysis. A "self-healing" property is introduced, enabling security to be continually re-established following partial compromises. In addition to producing useful cryptographic results, a typical leak-resistant cryptographic operation modifies or updates secret key material in a manner designed to render useless any information about the secrets that may have previously leaked from the system. Exemplary leak-proof and leak-resistant implementations of the invention are shown for symmetric authentication, certified Diffie-Hellman (when either one or both users have certificates), RSA, ElGamal public key decryption, ElGamal digital signing, and the Digital Signature Algorithm.

18 Claims, 4 Drawing Sheets

OTHER PUBLICATIONS

Alfred J. Menezes et al., "Handbook of Applied Cryptography" (CRC Press, 1996), pp. including 285–298, 312–319, 452–462, 475, 515–524.

J. Ryan, "Blinds for Thermodynamic Cipher Attacks," unpublished material on the World Wide Web at http://www.cybertrace.com/thrmatak.html, Mar. 1996.

Bruce Schneier, "Applied Cryptography, Second Edition: Protocols, Algorithms, and Source Code in C," Oct. 18, 1995, pp. 34–41 and 480–481.

Bank Technology News. Cries of Wolf Over Smart Card Security? Faulkner & Gray, Inc. Nov. 1, 1996.

LEAK-RESISTANT CRYPTOGRAPHIC METHOD AND APPARATUS

RELATED APPLICATION

This application is a divisional of U.S. patent application Ser. No. 09/224,682, now U.S. Pat. No. 6,304,658, filed on Dec. 31, 1998.

This application claims the benefit of U.S. Provisional Application No. 60/070,344 filed Jan. 2, 1998, and U.S. Provisional Application No. 60/089,529 filed Jun. 15, 1998.

FIELD OF THE INVENTION

The method and apparatus of the present invention relate generally to cryptographic systems and, more specifically, to securing cryptographic tokens that must maintain the security of secret information in hostile environments.

BACKGROUND OF THE INVENTION

Most cryptosystems require secure key management. In public-key based security systems, private keys must be protected so that attackers cannot use the keys to forge digital signatures, modify data, or decrypt sensitive information. Systems employing symmetric cryptography similarly require that keys be kept secret. Well-designed cryptographic algorithms and protocols should prevent attackers who eavesdrop on communications from breaking systems. However, cryptographic algorithms and protocols traditionally require that tamper-resistant hardware or other implementation-specific measures prevent attackers from accessing or finding the keys.

If the cryptosystem designer can safely assume that the key management system is completely tamper-proof and will not reveal any information relating to the keys except via the messages and operations defined in the protocol, then previously known cryptographic techniques are often sufficient for good security. It is currently extremely difficult, however, to make hardware key management systems that provide good security, particularly in low-cost unshielded cryptographic devices for use in applications where attackers will have physical control over the device. For example, cryptographic tokens (such as smartcards used in electronic cash and copy protection schemes) must protect their keys even in potentially hostile environments. (A token is a device that contains or manipulates cryptographic keys that need to be protected from attackers. Forms in which tokens may be manufactured include, without limitation, smartcards, specialized encryption and key management devices, secure telephones, secure picture phones, secure web servers, consumer electronics devices using cryptography, secure microprocessors, and other tamper-resistant cryptographic systems.)

A variety of physical techniques for protecting cryptographic devices are known, including enclosing key management systems in physically durable enclosures, coating integrated circuits with special coatings that destroy the chip when removed, and wrapping devices with fine wires that detect tampering. However, these approaches are expensive, difficult to use in single-chip solutions (such as smartcards), and difficult to evaluate since there is no mathematical basis for their security. Physical tamper resistance techniques are also ineffective against some attacks. For example, recent work by Cryptography Research has shown that attackers can non-invasively extract secret keys using careful measurement and analysis of many devices' power consumption. Analysis of timing measurements or electromagnetic radiation can also be used to find secret keys.

Some techniques for hindering external monitoring of cryptographic secrets are known, such as using power supplies with large capacitors to mask fluctuations in power consumption, enclosing devices in well-shielded cases to prevent electromagnetic radiation, message blinding to prevent timing attacks, and buffering of inputs/outputs to prevent signals from leaking out on I/O lines. Shielding, introduction of noise, and other such countermeasures are often, however, of limited value, since skilled attackers can still find keys by amplifying signals and filtering out noise by averaging data collected from many operations. Further, in smartcards and other tamper-resistant chips, these countermeasures are often inapplicable or insufficient due to reliance on external power sources, impracticality of shielding, and other physical constraints. The use of blinding and constant-time mathematical algorithms to prevent timing attacks is also known, but does not prevent more complex attacks such as power consumption analysis (particularly if the system designer cannot perfectly predict what information will be available to an attacker, as is often the case before a device has been physically manufactured and characterized).

The present invention makes use of previously-known cryptographic primitives and operations. For example: U.S. Pat. No. 5,136,646 to Haber et al. and the pseudorandom number generator used in the RSAREF cryptographic library use repeated application of hash functions; anonymous digital cash schemes use blinding techniques; zero knowledge protocols use hash functions to mask information; and key splitting and threshold schemes store secrets in multiple parts.

SUMMARY OF THE INVENTION

The present invention introduces leak-proof and leak-resistant cryptography, mathematical approaches to tamper resistance that support many existing cryptographic primitives, are inexpensive, can be implemented on existing hardware (whether by itself or via software capable of running on such hardware), and can solve problems involving secrets leaking out of cryptographic devices. Rather than assuming that physical devices will provide perfect security, leak-proof and leak-resistant cryptographic systems may be designed to remain secure even if attackers are able to gather some information about the system and its secrets. This invention describes leak-proof and leak-resistant systems that implement symmetric authentication, Diffie-Hellman exponential key agreement, ElGamal public key encryption, ElGamal signatures, the Digital Signature Standard, RSA, and other algorithms.

One of the characteristic attributes of a typical leak-proof or leak-resistant cryptosystem is that it is "self-healing" such that the value of information leaked to an attacker decreases or vanishes with time. Leak-proof cryptosystems are able to withstand leaks of up to $L_{MAX}$ bits of information per transaction, where $L_{MAX}$ is a security factor chosen by the system designer to exceed to the maximum anticipated leak rate. The more general class of leak-resistant cryptosystems includes leak-proof cryptosystems, and others that can withstand leaks but are not necessarily defined to withstand any defined maximum information leakage rate. Therefore, any leak-proof system shall also be understood to be leak-resistant. The leak-resistant systems of the present invention can survive a variety of monitoring and eavesdropping attacks that would break traditional (non-leak-resistant) cryptosystems.

A typical leak-resistant cryptosystem of the present invention consists of three general parts. The initialization or key generation step produces secure keying material appropriate for the scheme. The update process cryptographically modifies the secret key material in a manner designed to render useless any information about the secrets that may have previously leaked from the system, thus providing security advantages over systems of the background art. The final process performs cryptographic operations, such as producing digital signatures or decrypting messages.

DETAILED DESCRIPTION OF THE INVENTION

Figure 1:
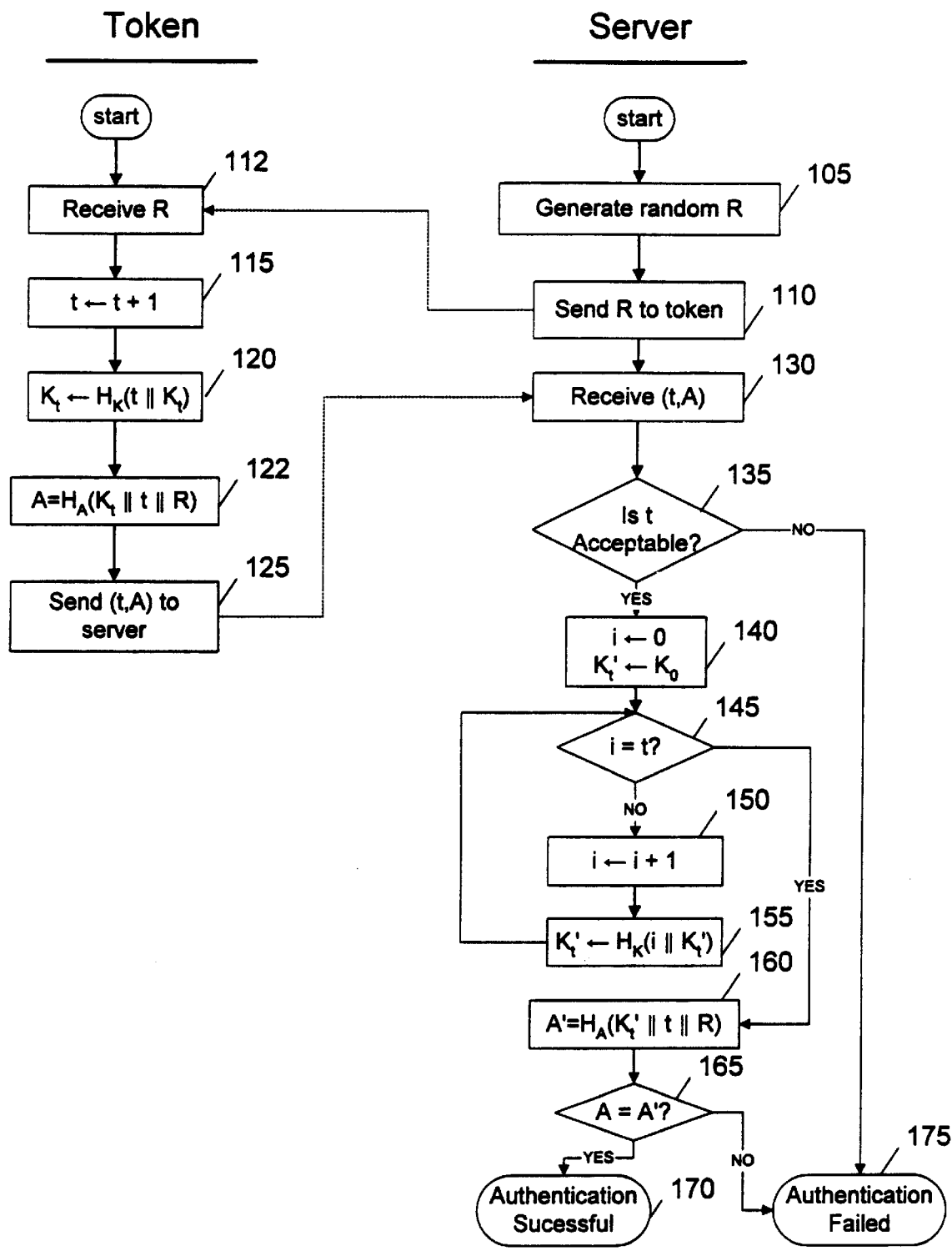
FIG. 1 shows an exemplary leak-resistant symmetric authentication method.

U.S. patent application Ser. No. 09/224,682, now U.S. Pat. No. 6,304,658, is hereby incorporated herein by reference.

The sections following will describe an introduction to leak-proof/leak-resistant cryptography, followed by various embodiments of the general techniques of the invention as applied to improve the security of common cryptographic protocols.

I. Introduction and Terminology

The leakage rate L is defined as the number of bits of useful information about a cryptosystem's secrets that are revealed per operation, where an operation is a cryptographic transaction. Although an attacker may be able to collect more than L bits worth of measurement data, by definition this data yields no more than L bits of useful information about the system's secrets.

The implementer of a leak-proof system chooses a design parameter $L_{MAX}$, the maximum amount of leakage per operation the system may allow if it is to remain uncompromised. $L_{MAX}$ should be chosen conservatively, and normally should significantly exceed the amount of useful information known to be leaked to attackers about the system's secrets during each transaction. Designers do not necessarily need to know accurately or completely the quantity and type of information that may leak from their systems; the choice of $L_{MAX}$ may be made using estimates and models for the system's behavior. General factors affecting the choice of $L_{MAX}$ include the types of monitoring potentially available to attackers, the amount of error in attacker3 measurements, and engineering constraints that limit $L_{MAX}$. (Larger values of $L_{MAX}$ increase memory and performance requirements of the device, and in some cases may increase L.) To estimate the amount of useful information an attacker could collect by monitoring a device's power consumption, for example, a designer might consider the amount of noise in the device's power usage, the power line capacitance, the useful time resolution for power consumption measurements, as well as the strength of the signals being monitored. Similarly, the designer knows that timing measurements can rarely yield more than a few bits of information per operation, since timing information is normally quantized to an integral number of clock cycles. In choosing $L_{MAX}$, the designer should assume that attackers will be able to combine information gleaned from multiple types of attacks. If the leakage rate is too large (as in the extreme case where L equals the key size because the entire key can be extracted during a single transaction), additional design features should be added to reduce L and reduce the value needed for $L_{MAX}$. Such additional measures can include known methods, such as filtering the device's power inputs, adding shielding, introducing noise into the timing or power consumption, implementing constant-time and constant execution path algorithms, and changing the device layout. Again, note that the designer of a leak-resistant system does not actually need to know what information is being revealed or how it is leaked; all he or she need do is choose an upper bound for the rate at which attackers might learn information about the keys. In contrast, the designer of a traditional system faces the much harder task of ensuring that no information about the secrets will leak out.

There are many ways information about secrets can leak from cryptosystems. For example, an attacker can use a high-speed analog-to-digital converter to record a smartcard's power consumption during a cryptographic operation. The amount of useful information that can be gained from such a measurement varies, but it would be fairly typical to gain enough information to guess each of 128 key bits correctly with a probability of 0.7. This information can reduce the amount of effort required for a brute force attack. For example, a brute force attack with one message against a key containing k bits where each bit's value is known with probability p can be completed in $$E(k, p) = \sum_{i=0}^{k} \left[ \binom{k}{i}(1-p)^i p^{k-i} \left[ \left[ \sum_{j=0}^{i} \binom{k}{j} \right] - \frac{1}{2}\binom{k}{i} \right] + \frac{1}{2} \right]$$

operations. The reduction in the effort for a brute force attack is equivalent to shortening the key by $L=\log_2(E(k,\frac{1}{2})/E(k,p))=\log_2(k-E(k,p)-1)$ bits. (For example, in the case of k=128 and p=0.7, L is estimated to be about 11 bits for the first measurement. With a multiple message attack, the attacker's effort can fall to as low as $$E(k, p) = \frac{1}{p^k}.)$$

Attackers can gain additional information about the keys by measuring additional operations; unless leak-resistance is used, finding the key becomes easy after just a few dozen operations.

When choosing $L_{MAX}$, a system designer should consider the signal-to-noise ratio of an attacker's measurements. For example, if the signal and noise are of roughly equivalent magnitude, the designer knows that an attacker's measurements should be incorrect about 25 percent of the time (e.g., p=0.75 if only one observation per key bit is possible). Many measurement techniques, such as those involving timing, may have signal-to-noise ratios of 1:100 or worse. With such systems, L is generally quite small, but attackers who can make a large number of measurements can use averaging or other statistical techniques to recover the entire key. In extreme cases, attackers may be able to obtain all key bits with virtually perfect accuracy from a single transaction (i.e., L=k), necessitating the addition of shielding, noise in the power consumption (or elsewhere), and other measures to reduce p and L. Of course, $L_{MAX}$ should be chosen conservatively; in the example above where less than 4 useful bits are obtained per operation for the given attack, the designer might select $L_{MAX}=64$ for a leak-proof design.

Leak-proof (and, more generally, leak-resistant) cryptosystems provide system designers with important advantages. When designing a traditional (i.e., non-leak-resistant and non-leak-proof) cryptosystem, a careful cryptosystem designer should study all possible information available to attackers if he or she is to ensure that no analytical techniques could be used to compromise the keys. In practice, many insecure systems are developed and deployed because such analysis is incomplete, too difficult even to attempt, or because the cryptographers working on the system do not understand or cannot completely control the physical characteristics of the device they are designing. Unexpected manufacturing defects or process changes, alterations made to the product by attackers, or modifications made to the product in the field can also introduce problems. Even a system designed and analyzed with great care can be broken if new or improved data collection and analysis techniques are found later. In contrast, with leak-proof cryptography, the system designer only needs to define an upper bound on the maximum rate at which attackers can extract information about the keys. A detailed understanding of the information available to attackers is not required, since leak-proof (and leak-resistant) cryptosystem designs allow for secret information in the device to leak out in (virtually) any way, yet remain secure despite this because leaked information is only of momentary value.

In a typical leak-proof design, with each new cryptographic operation i, the attacker is assumed to be able to choose any function $F_i$ and determine the $L_{MAX}$-bit result of computing $F_i$ on the device's secrets, inputs, intermediates, and outputs over the course of the operation. The attacker is even allowed to choose a new function $F_i$ with each new operation. The system may be considered leak-proof with a security factor n and leak rate $L_{MAX}$ if, after observing a large number of operations, an attacker cannot forge signatures, decrypt data, or perform other sensitive operations without performing an exhaustive search to find an n-bit key or performing a comparable $O(2^n)$ operation. In addition to choosing $L_{MAX}$, designers also choose n, and should select a value large enough to make exhaustive search infeasible. In the sections that follow, various embodiments of the invention, as applied to improve the security of common cryptographic operations and protocols, will be described in more detail.

II. Symmetric Cryptographic Protocols

A. Symmetric Authentication

An exemplary cryptographic protocol that can be secured using the techniques of the present invention is symmetric authentication.

1. Conventional Symmetric Authentication

Assume a user wishes to authenticate herself to a server using an n-bit secret key, K, known to both the server and the user's cryptographic token, but not known to attackers. The cryptographic token should be able to resist tampering to prevent, for example, attackers from being able to extract secrets from a stolen token. If the user's token has perfect tamper resistance (i.e., L=0), authentication protocols of the background art can be used. Typically the server sends a unique, unpredictable challenge value R to the user's token, which computes the value A=H(R∥K), where "∥" denotes concatenation and H is a one-way cryptographic hash function such as SHA. The user sends A to the server, which independently computes A (using its copy of K) and compares its result with the received value. The user authentication succeeds only if the comparison operation indicates a match.

If the function H is secure and if K is sufficiently large to prevent brute force attacks, attackers should not be able to obtain any useful information from the (R,A) values of old authentication sessions. To ensure that attackers cannot impersonate users by replaying old values of A, the server generates values of R that are effectively (with sufficiently high probability) unique. In most cases, the server should also make R unpredictable to ensure that an attacker with temporary possession of a token cannot compute future values of A. For example, R might be a 128-bit number produced using a secure random number generator (or pseudorandom number generator) in the server. The properties of cryptographic hash functions such as H have been the subject of considerable discussion in the literature, and need not be described in detail here. Hash functions typically provide functionality modeled after a random oracle, deterministically producing a particular output from any input. Ideally, such functions should be collision-resistant, non-invertable, should not leak partial information about the input from the output, and should not leak information about the output unless the entire input is known. Hash functions can have any output size. For example, MD5 produces 128-bit outputs and SHA produces 160-bit outputs. Hash functions may be constructed from other cryptographic primitives or other hash functions.

While the cryptographic security of the protocol using technology of the background art may be good, it is not leak-proof; even a one-bit leak function (with L=1) can reveal the key. For example, if the leak function F equals bit (R mod n) of K, an attacker can break the system quickly since a new key bit is revealed with every transaction where (R mod n) has a new value. Therefore, there is a need for a leak-proof/leak-resistant symmetric authentication protocol.

2. Leak-Resistant Symmetric Authentication

The following is one embodiment of a leak-resistant (and, in fact, also leak-proof) symmetric authentication protocol, described in the context of a maximum leakage rate of $L_{MAX}$ bits per transaction from the token and a security factor n, meaning that attacks of complexity $O(2^n)$, such as brute-force attacks against an n-bit key, are acceptable, but there should not be significantly easier attacks. The user's token maintains a counter t, which is initialized to zero, and an $(n+2L_{MAX})$-bit shared secret $K_t$, which is initialized with a secret $K_0$. Note that against adversaries performing precomputation attacks based on Hellman's time/memory trade-off, larger values of n may be in order. Note also that some useful protocol security features, such as user and/or server identifiers in the hash operation inputs, have been omitted for simplicity in the protocol description. It is also assumed that no leaking will occur from the server. For simplicity in the protocol description, some possible security features (such as user and/or server identifiers in the hash operation inputs) have been omitted, and it is assumed that the server is in a physically secure environment. However, those skilled in the art will appreciate that the invention is not limited to such assumptions, which have been made as a matter of convenience rather than necessity.

As in the traditional protocol, the server begins the authentication process by generating a unique and unpredictable value R at step 105. For example, R might be a 128-bit output from a secure random number generator. At step 110, the server sends R to the user's token. At step 112, the token receives R. At step 115, the token increments its counter t by computing t←t+1. At step 120, the token updates $K_t$ by computing $K_t \leftarrow H_K(t \| K_t)$, where $H_K$ is a cryptographic hash function that produces an $(n+2L_{MAX})$ bit output from the old value of $K_t$ and the (newly incremented) value of t. Note that in the replacement operations (denoted "←"), the token deletes the old values of t and $K_t$, replacing them with the new values. By deleting the old $K_t$, the token ensures that future leak functions cannot reveal information about the old (deleted) value. At step 122, the token uses the new values of t and $K_t$ to compute an authenticator $A=H_A(K_t\|t\|R)$. At step 125, the token sends both t and the authenticator A to the server, which receives them at step 130. At step 135, the server verifies that t is acceptable (e.g., not too large but larger than the value received in the last successful authentication). If t is invalid, the server proceeds to step 175. Otherwise, at step 140, the server initializes its loop counter i to zero and its key register $K_t'$ to $K_0$. At step 145, the server compares i with the received value of t, proceeding to step 160 if they are equal. Otherwise, at step 150, the server increments i by computing i←i+1. At step 155, the server computes $K_t' \leftarrow H_K(i\|K_t')$, then proceeds back to step 145. At step 160, the server computes $A'=H_A(K_t'\|t\|R)$. Finally, at step 165, the server compares A and A', where the authentication succeeds at step 170 if they match, or fails at 175 if they do not match.

This design assumes that at the beginning of any transaction the attacker may have $L_{MAX}$ bits of useful information about the state of the token (e.g., $K_t$) that were obtained using the leak function F in a previous operation. During the transaction, the attacker can gain an additional $L_{MAX}$ bits of useful information from the token. If, at any time, any $2L_{MAX}$ (or fewer) bits of useful information about the secret are known to the attacker, there are still $(n+2L_{MAX})-2L_{MAX}=n$ or more unknown bits. These n bits of unknown information ensure that attacks will require $O(2^n)$ effort, corresponding to the desired security factor. However, the attacker should have no more than $L_{MAX}$ bits of useful information about $K_t$ at the end of the transaction. The property that attackers lose useful information during normal operation of the system is a characteristic of the leak-proof or leak-resistant cryptosystem. In general, this information loss is achieved when the cryptosystem performs operations that convert attackers' useful partial information about the secret into useless information. (Information is considered useless if it gives an attacker nothing better than the ability to test candidate values in an $O(2^n)$ exhaustive search or other "hard" operation. For example, if exhaustive search of X is hard and H is a good hash function, H(X) is useless information to an attacker trying to find X.)

Thus, the attacker is assumed to begin with $L_{MAX}$ bits of useful information about $K_t$ before the token's $K_t \leftarrow H_K(t\|K_t)$ computation. (Initial information about anything other than $K_t$ is of no value to an attacker because $K_t$ is the only secret value in the token. The function $H_K$ and the value of t are not assumed to be secret.) The attacker's information can be any function of $K_t$ produced from the previous operation's leaks.

3. Security Characteristics of Leak-Proof Systems

The following section provides a technical discussion of the security characteristics of the exemplary leak-proof system described above. The following analysis is provided as an example of how the design can be analyzed, and how a system may be designed using general assumptions about attackers' capabilities. The discussion and assumptions do not necessarily apply to other embodiments of the invention and should not be construed as limiting the scope or applicability of the invention in any way.

During the course of a transaction, the leak function F might reveal up to $L_{MAX}$ information about the system and its secrets. The design assumed that any information contained in the system may be leaked by F, provided that F does not reveal useful new information about values of $K_t$ that were deleted before the operation started, and F does not reveal useful information about values of $K_t$ that will be computed in future operations. These constraints are completely reasonable, since real-world leaks would not reveal information about deleted or not-yet-existent data. (The only way information about future $K_t$ values could be leaked would be the bizarre case where the leak function itself included, or was somehow derived from, the function $H_K$.) In practice, these constraints on F are academic and of little concern, but they are relevant when constructing proofs to demonstrate the security of a leak-proof system.

If the leak occurs at the beginning of the $H_K$ computation, it could give the attacker up to $2L_{MAX}$ bits of useful information about the input value of $K_t$. Because $K_t$ contains $(2L_{MAX}+n)$ bits of secret information and the attacker may have up to $2L_{MAX}$ bits of useful information about the initial value of $K_t$, there remain at least $(2L_{MAX}+n)-2L_{MAX}=n$ bits of information in $K_t$ that are secret. The hash function $H_K$ effectively mixes up these n bits to produce a secure new $K_t$ during each transaction such that the attacker's information about the old $K_t$ is no longer useful.

If the leak occurs at the end of the $H_K$ computation, it could give an attacker up to $L_{MAX}$ bits of information about the final value of $H_K$, yielding $L_{MAX}$ bits of information about the input to the subsequent transaction. This is not a problem, since the design assumes that attackers have up to $L_{MAX}$ bits of information about $K_t$ at the beginning of each transaction.

A third possibility is that the attacker's $L_{MAX}$ bits of information might describe intermediates computed during the operation $H_K$. However, even if the attacker could obtain $L_{MAX}$ new bits of information about the input to $H_K$ and also $L_{MAX}$ bits of information about the output from $H_K$, the system would be secure, since the attacker would never have more than $2L_{MAX}$ bits of information about the input $K_t$ or more than $L_{MAX}$ bits of information about the output $K_t$. Provided that $L_{MAX}$ bits of information from within $H_K$ cannot reveal more than $L_{MAX}$ bits of information about the input, or more than $L_{MAX}$ bits of information about the output, the system will be secure. This will be true unless $H_K$ somehow compresses the input to form a short intermediate which is expanded to form the output. While hash functions whose internal states are smaller than their outputs should not be used, most cryptographic hash functions are fine.

A fourth possibility is that part or all of the leak could occur during the $A=H_A(K_t\|t\|R)$ calculation. The attacker's total "budget" for observations is $L_{MAX}$ bits. If $L_1$ bits of leak occur during the $H_K$ computation, an additional $L_2$ bits of information can leak during the $A=H_A(K_t\|t\|R)$ operation, where $L_2 \leq L_{MAX}-L_1$. If the second leak provides information about $K_t$, this is no different from leaking information about the result of the $H_K$ computation; the attacker will still conclude the transaction with no more than $L_{MAX}$ bits of information about $K_t$ because $L_1+L_2 \leq L_{MAX}$. However, the second leak could reveal information about A. To keep A secure against leaks (to prevent, for example, an attacker from using a leak to capture A and using A before the legitimate user can), the size of A should include an extra $L_{MAX}$ bits (to provide security even if $L_2=L_{MAX}$). Like $H_K$, $H_A$ should not leak information about deleted or future values of $K_t$ that are not used in or produced by the given operation. As with the similar assumptions on leaks from $H_K$, this limitation is primarily academic and of little practical concern, since real-world leak functions do not reveal information about deleted or not-yet-computed data. However, designers might be cautious when using unusual designs for $H_A$ that are based on or derived from $H_K$, particularly if the operation $H_A(K_t\|t\|R)$ could reveal useful information about the result of computing $H_K(t\|K_t)$.

B. Other Leak-Resistant Symmetric Schemes

The same basic technique of updating a key (K) with each transaction, such that leakage about a key during one transaction does not reveal useful information about a key in a subsequent (or past) transaction, can be easily extended to other applications besides authentication.

1. Symmetric Data Verification

For example and without limitation, leak-resistant symmetric data verification is often useful where a device needs to support symmetrically-signed code, data, content, or parameter updates (all of which will, as a matter of convenience, be denoted as "data" herein). In existing systems, a hash or MAC of the data is typically computed using a secret key and the data is rejected if computed hash or MAC does not match a value received with the data. For example, a MAC may be computed as HMAC(K,data), where HMAC is defined in "RFC 2104, HMAC:Keyed-Hashing for Message Authentication" by H. Krawczyk, M. Bellare, and R. Canetti, 1997. Traditional (non-leak-resistant) designs are often vulnerable to attacks including power consumption analysis of MAC functions and timing analysis of comparison operations.

In an exemplary leak-resistant verification protocol, a verifying device (the "verifier") maintains a counter t and a key $K_t$, which are initialized (for example at the factory) with t←0 and $K_t$←$K_0$. Before the transaction, the verifier provides t to the device providing the signed data (the "signer"), which also knows $K_0$. The signer uses t to compute $K_{t+1}'$ (the prime indicating a quantity derived by the signer, rather than at the verifier) from $K_0$ (or $K_i'$ or any other available value of $K_i'$). using the relation $K_i'=H_K(i\|K_{i-1}')$, computes signature S'=HMAC($K_{t+1}'$, data), and sends S' plus any other needed information (such as data or t) to the verifier. The verifier confirms that the received value of t (if any) matches its value of t, and rejects the signature if it does not. If t matches, the verifier increments t and updates $K_t$ in its nonvolatile memory by computing t←t+1 and $K_t$←$H_K$(t∥$K_t$). In an alternative embodiment, if the received value of t is larger than the internal value but the difference is not unreasonably large, it may be more appropriate to accept the signature and perform multiple updates to $K_t$ (to catch up with the signer) instead of rejecting the signature outright. Finally, the verifier computes S=HMAC($K_t$, data) and verifies that S=S', rejecting the signature if S does not equal the value of S' received with the data.

2. Symmetric Encryption

Besides authentication and verification, leak-resistant symmetric cryptography can also be tailored to a wide variety of applications and environments. For example, if data encryption is desired instead of authentication, the same techniques as were disclosed above may be used to generate a key $K_t$ used for encryption rather than verification.

3. Variations in Computational Implementation

In the foregoing, various applications were disclosed for the basic technique of updating a key $K_t$ in accordance with a counter and deleting old key values to ensure that future leakage cannot reveal information about the now-deleted key. Those skilled in the art will realize, however, that the exemplary techniques described above may be modified in various ways without departing from the spirit and scope of the invention. For example, if communications between the device and the server are unreliable (for example if the server uses voice recognition or manual input to receive t and A), then small errors in the signature may be ignored. (One skilled in the art will appreciate that many functions may be used to determine whether a signature corresponds—sufficiently closely—to its expected value.) In another variation of the basic technique, the order of operations and of data values may be adjusted, or additional steps and parameters may be added, without significantly changing the invention. In another variation, to save on communication bandwidth or memory, the high order bits or digits of t may not need to be communicated or remembered. In another variation, as a performance optimization, devices need not recompute $K_t$ from $K_0$ with each new transaction. For example, when a transaction succeeds, the server can discard $K_0$ and maintain the validated version of $K_t$. In another variation, if bi-directional authentication is required, the protocol can include a step whereby the server can authenticates itself to the user (or user's token) after the user's authentication is complete. In another variation, if the server needs to be secured against leaks as well (as in the case where the role of "server" is played by an ordinary user), it can maintain its own counter t. In each transaction, the parties agree to use the larger of their two t values, where the device with the smaller t value performs extra updates to $K_t$ to synchronize t. In an alternate embodiment for devices that contain a clock and a reliable power source (e.g., battery), the update operation may be performed periodically, for example by computing $K_t$←$H_K(t\|K_t)$ once per second. The token uses the current $K_t$ to compute A=$H_A(K_t\|t\|R)$ or, if the token does not have any means for receiving R, it can output A=$H_A(K_t)$. The server can use its clock and local copy of the secret to maintain its own version of $K_t$, which it can use to determine whether received values of A are recent and correct. All of the foregoing show that the method and apparatus of the present invention can be implemented using numerous variations and modifications to the exemplary embodiments described herein, as would be understood by one skilled in the art.

III. Asymmetric Cryptographic Protocols

The foregoing illustrates various embodiments of the invention that may be used with symmetric cryptographic protocols. As will be seen below, still other techniques of the present invention may be used in connection with asymmetric cryptographic operations and protocols. While symmetric cryptosystems are sufficient for some applications, asymmetric cryptography is required for many applications. There are several ways leak resistance can be incorporated into public key cryptosystems, but it is often preferable to have as little impact as possible on the overall system architecture. Most of the exemplary designs have thus been chosen to incorporate leak resistance into widely used cryptosystems in a way that only alters the key management device, and does not affect the certification process, certificate format, public key format, or processes for using the public key.

A. Certified Diffie-Hellman

Diffie-Hellman exponential key exchange is a widely used asymmetric protocol whereby two parties who do not share a secret key can negotiate a shared secret key. Implementations of Diffie-Hellman can leak information about the secret exponents, enabling attackers to determine the secret keys produced by those implementations. Consequently, a leak-resistant implementation of Diffie-Hellman would be useful. To understand such a leak-resistant implementation, it will be useful to first review a conventional Diffie-Hellman implementation.

1. Conventional Certified Diffie-Hellman

Typical protocols in the background art for performing certified Diffie-Hellman exponential key agreement involve two communicating users (or devices) and a certifying authority (CA). The CA uses an asymmetric signature algorithm (such as DSA) to sign certificates that specify a user's public Diffie-Hellman parameters (the prime p and generator g), public key ($p^x$ mod g, where x is the user's secret exponent), and auxiliary information (such as the user's identity, a description of privileges granted to the certificate holder, a serial number, expiration date, etc.). Certificates may be verified by anyone with the CA's public signature verification key. To obtain a certificate, user U typically generates a secret exponent ($x_u$), computes his or her own public key $y_u = g^{x_u}$ mod p, presents $y_u$ along with any required auxiliary identifying or authenticating information (e.g., a passport) to the CA, who issues the user a certificate $C_u$. Depending on the system, p and g may be unique for each user, or they may be system-wide constants (as will be assumed in the following description of Diffie-Hellman using the background art).

Using techniques of the background art, Alice and Bob can use their certificates to establish a secure communication channel. They first exchange certificates ($C_{Alice}$ and $C_{Bob}$). Each verifies that the other's certificate is acceptable (e.g., properly formatted, properly signed by a trusted CA, not expired, not revoked, etc.). Because this protocol will assume that p and g are constants, they also check that the certificate's p and g match the expected values. Alice extracts Bob's public key ($y_{Bob}$) from $C_{Bob}$ and uses her secret exponent ($x_{Alice}$) to compute $z_{Alice} = (y_{Bob})^{x_{Alice}}$ mod p. Bob uses his secret exponent and Alice's public key to compute $z_{Bob} = (y_{Alice})^{x_{Bob}}$ mod p. If everything works correctly, $z_{Alice} = z_{Bob}$, since:

$$z_{Alice} = (y_{Bob})^{x_{Alice}} \bmod p$$
$$= (g^{x_{Bob}})^{x_{Alice}} \bmod p$$
$$= (g^{x_{Alice}})^{x_{Bob}} \bmod p$$
$$= (y_{Alice})^{x_{Bob}} \bmod p$$
$$= z_{Bob}.$$

Thus, Alice and Bob have a shared key $z = z_{Alice} = z_{Bob}$. An attacker who pretends to be Alice but does not know her secret exponent ($x_{Alice}$) will not be able to compute $z_{Alice} = (y_{Bob})^{x_{Alice}}$ mod p correctly. Alice and Bob can positively identify themselves by showing that they correctly found z. For example, each can compute and send the other the hash of z concatenated with their own certificate. Once Alice and Bob have verified each other, they can use a symmetric key derived from z to secure their communications. (For an example of a protocol in the background art that uses authenticated Diffie-Hellman, see "The SSL Protocol Version 3.0" by A. Freier, P. Karlton, and P. Kocher, Mar. 1996.)

2. Leak-Resistant Certified Diffie-Hellman

A satisfactory leak-resistant public key cryptographic scheme should overcome the problem that, while certification requires the public key be constant, information about the corresponding private key should not leak out of the token that contains it. In the symmetric protocol described above, the design assumes that the leak function reveals no useful information about old deleted values of $K_t$ or about future values of $K_t$ that have not yet been computed. Existing public key schemes, however, require that implementations repeatedly perform a consistent, usually deterministic, operation using the private key. For example, in the case of Diffie-Hellman, a leak-resistant token that is compatible with existing protocols and implementations should be able to perform the secret key operation $y^x$ mod p, while ensuring that the exponent x remains secret. The radical reshuffling of the secret provided by the hash finction $H_K$ in the symmetric approach cannot be used because the device should be able to perform the same operation consistently.

The operations used by the token to perform the private key operation are modified to add leak resistance using the following variables:

| Register | Comment |
| --- | --- |
| $x_1$ | First part of the secret key (in nonvolatile updateable memory) |
| $x_2$ | Second part of the secret key (in nonvolatile updateable memory) |
| g | The generator (not secret). |
| p | The public prime, preferably a strong prime (not secret). |

The prime p and generator g may be global parameters, or may be specific to individual users or groups of users (or tokens). In either case, the certificate recipient should be able to obtain p and g securely, usually as built-in constants or by extracting them from the certificate.

To generate a new secret key, the key generation device (often but not always the cryptographic token that will contain the key) first obtains or generates p and g, where p is the prime and g is a generator mod p. If p and g are not system-wide parameters, algorithms known in the background art for selecting large prime numbers and generators may be used. It is recommended that p be chosen with $(p-1)/2$ also prime, or at least that $\phi(p)$ not be smooth. (When $(p-1)/2$ is not prime, information about $x_1$ and $x_2$ modulo small factors of $\phi(p)$ may be leaked, which is why it is preferable that $\phi(p)$ not be smooth. Note that $\phi$ denotes Euler's totient function.) Once p and g have been chosen, the device generates two random exponents $x_1$ and $x_2$. The lowest-order bit of $x_1$ and of $x_2$ is not considered secret, and may be set to 1. Using p, g, $x_1$ and $x_2$, the device can then compute its public key as $g^{x_1 x_2}$ mod p and submit it, along with any required identifying information or parameters needed (e.g., p and g), to the CA for certification.

Figure 2:
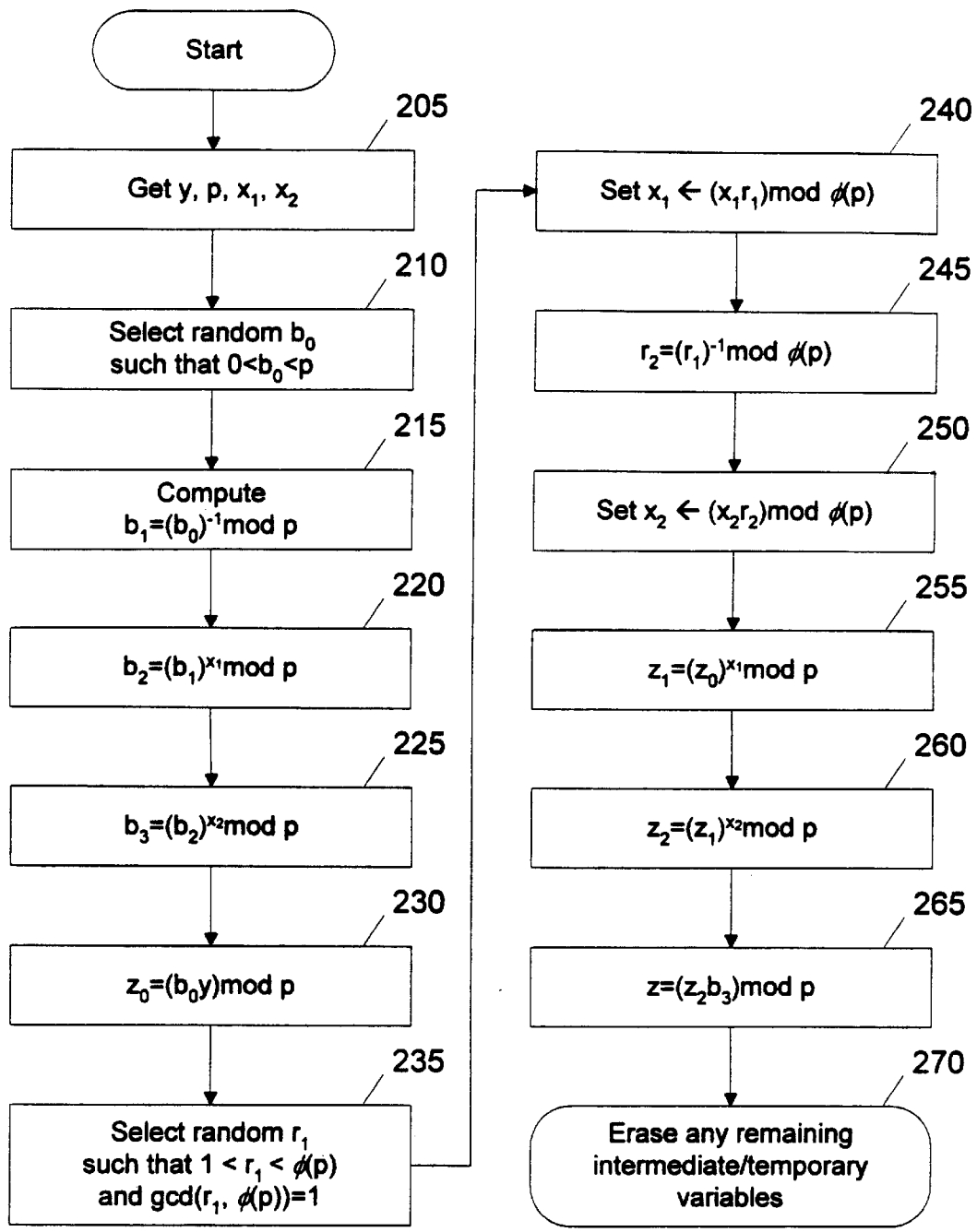
FIG. 2 shows an exemplary leak-resistant Diffie-Hellman exponential key exchange operation.

FIG. 2 illustrates the process followed by the token to perform private key operations. At step 205, the token obtains the input message y, its own (non-secret) prime p, and its own secret key halves ($x_1$ and $x_2$). If $x_1$, $x_2$, and p are stored in encrypted and/or authenticated form, they would be decrypted or verified at this point. At this step, the token should verify that $1 < y < -1$. At step 210, the token uses a random number generator (or pseudorandom number generator) to select a random integer $b_0$, where $0 < b_0 < p$. At step 215, the token computes $b_1 = b_0^{-1}$ mod p. The inverse computation mod p may be performed using the extended Euclidean algorithm or the formula $b_1 = b_0^{\phi(p)-1}$ mod p. At step 220, the token computes $b_2 = b_1^{x_1}$ mod p. At this point, $b_1$ is no longer needed; its storage space may be used to store $b_2$. Efficient algorithms for computing modular exponentiation, widely known in the art, may be used to complete step 220. Alternatively, when a fast modular exponentiator is available, the computation $b_2$ may be performed using the relationship $b_2 = b_0^{\phi(p)-x_1}$ mod p. At step 225, the token computes $b_3 = b_2^{x_2}$ mod p. At this point, $b_2$ is no longer needed; its storage space may be used to store $b_3$. At step 230, the token computes $z_0 = b_0 y$ mod p. At this point, y and $b_0$ are no longer needed; their space may be used to store $r_1$ (computed at step 235) and $z_0$. At step 235, the token uses a random number generator to select a random integer $r_1$, where $0 < r_1 < \phi(p)$ and $\gcd(r_1, \phi(p)) = 1$. (If $p-1/2$ is known to be prime, it is sufficient to verify that $r_1$ is odd.) At step 240, the token updates $x_1$ by computing $x_1 \leftarrow x_1 r_1$ mod $\phi(p)$. The old value of $x_1$ is deleted and replaced with the updated value. At step 245, the token computes $r_2 = (r_1^{-1})$ mod $\phi(p)$. If $p-1/2$ is prime, then $r_2$ can be found using a modular exponentiator and the Chinese Remainder Theorem. Note that $r_1$ is not needed after this step, so its space may be used to store $r_2$. At step 250, the token updates $x_2$ by computing $x_2 \leftarrow x_2 r_2$ mod $\phi(p)$. The old value of $x_2$ should be deleted and replaced with the updated value. At step 255, the token computes $z_1 = (z_0)^{x_1}$ mod p. Note that $z_0$ is not needed after this step, so its space may be used to store $z_1$. At step 260, the token computes $z_2 = (z_1)^{x_2}$ mod p. Note that $z_1$ is not needed after this step, so its space may be used to store $z_2$. At step 265, the token finds the exponential key exchange result by computing $z = z_2 b_3$ mod p. Finally, at step 270, the token erases and frees any remaining temporary variables.

The process shown in FIG. 2 correctly computes $z = y^x$ mod p, where $x = x_1 x_2$ mod $\phi(p)$, since:

$$\begin{aligned} z &= z_2 b_3 \bmod p \\ &= (z_1^{x_2} \bmod p)(b_2^{x_2} \bmod p) \bmod p \\ &= ((z_0^{x_1} \bmod p)^{x_2})((b_1^{x_1} \bmod p)^{x_2}) \bmod p \\ &= (b_0 y \bmod p)^{x_1 x_2} (b_0^{-1} \bmod p)^{x_1 x_2} \bmod p \\ &= y^{x_1 x_2} \bmod p \\ &= y^x \bmod p. \end{aligned}$$

The invention is useful for private key owners communicating with other users (or devices) who have certificates, and also when communicating with users who do not.

If Alice has a certificate and wishes to communicate with Bob who does not have a certificate, the protocol proceeds as follows. Alice sends her certificate ($C_{Alice}$) to Bob, who receives it and verifies that it is acceptable. Bob extracts $y_{Alice}$ (along with $p_{Alice}$ and $g_{Alice}$, unless they are system-wide parameters) from $C_{Alice}$. Next, Bob generates a random exponent $x_{BA}$, where $0 < x_{AB} < \phi(p_{Alice})$. Bob then uses his exponent $x_{AB}$ and Alice's parameters to calculate $y_{BA} = (g_{Alice}^{x_{BA}})$ mod $p_{Alice}$ and the session key $z = (y_{Alice}^{x_{BA}})$ mod $p_{Alice}$. Bob sends $y_{BA}$ to Alice, who performs the operation illustrated in FIG. 2 to update her internal parameters and derive z from $y_{BA}$. Alice then proves that she computed z correctly, for example by sending Bob $H(z \| C_{Alice})$. (Alice cannot authenticate Bob because he does not have a certificate. Consequently, she does not necessarily need to verify that he computed z successfully.) Finally, Alice and Bob can use z (or, more commonly, a key derived from z) to secure their communications.

If both Alice and Bob have certificates, the protocol works as follows. First, Alice and Bob exchange certificates ($C_{Alice}$ and $C_{Bob}$), and each verifies that other's certificate is valid. Alice then extracts the parameters $p_{Bob}$, $g_{Bob}$, and $y_{Bob}$ from $C_{Bob}$, and Bob extracts $p_{Alice}$, $g_{Alice}$, and $y_{Alice}$ from $C_{Alice}$. Alice then generates a random exponent $x_{AB}$ where $0 < x_{AB} < \phi(p_{Bob})$, computes $y_{AB} = (g_{Bob})^{x_{AB}}$ mod $p_{Bob}$, and computes $z_{AB} = (y_{Bob})^{x_{AB}}$ mod $p_{Bob}$. Bob generates a random $x_{BA}$ where $0 < x_{BA} < \phi(p_{Alice})$, computes $y_{BA} = (g_{Alice})^{x_{BA}}$ mod $p_{Alice}$, and computes $Z_{BA} = (y_{Alice})^{x_{BA}}$ mod $p_{Alice}$. Bob sends $y_{BA}$ to Alice, and Alice sends $y_{AB}$ to Bob. Alice and Bob each perform the operation shown in FIG. 2, where each uses the prime p from their own certificate and their own secret exponent halves ($x_1$ and $x_2$). For the message y in FIG. 2, Alice uses $y_{BA}$ (received from Bob), and Bob uses $y_{AB}$ (received from Alice). Using the process shown in FIG. 2, Alice computes z. Using z and $z_{AB}$ (computed previously), she can find a session key K. This may be done, for example, by using a hash function H to compute $K = H(z \| z_{AB})$. The value of z Bob obtains using the process shown in FIG. 2 should equal Alice's $z_{AB}$, and Bob's $z_{BA}$ (computed previously) should equal Alice's z. If there were no errors or attacks, Bob should thus be able to find K, e.g., by computing $K = H(z_{BA} \| z)$. Alice and Bob now share K. Alice can prove her identity by showing that she computed K correctly, for example by sending Bob $H(K \| C_{Alice})$. Bob can prove his identity by sending Alice $H(K \| C_{Bob})$. Alice and Bob can then secure their communications by encrypting and authenticating using K or a key derived from K.

Note that this protocol, like the others, is provided as an example only; many variations and enhancements of the present invention are possible and will be evident to one skilled in the art. For example, certificates may come from a directory, more than two parties can participate in the key agreement, key escrow functionality may be added, the prime modulus p may be replaced with a composite number, etc. Note also that Alice and Bob as they are called in the protocol are not necessarily people; they would normally be computers, cryptographic devices, etc.

For leak resistance to be effective, attackers should not be able to gain new useful information about the secret variables with each additional operation unless a comparable amount of old useful information is made useless. While the symmetric design is based on the assumption that leaked information will not survive the hash operation $H_K$, this design uses multiplication operations mod $\phi(p)$ to update $x_1$ and $x_2$. The most common variety of leaked information, statistical information about exponent bits, is not of use to attackers in this design, as the exponent update process ($x_1 \leftarrow x_1 r_1$ mod $\phi(p)$ and $x_2 \leftarrow x_2 r_2$ mod $\phi(p)$) destroys the utility of this information. The only relevant characteristic that survives the update process is that $x_1 x_2$ mod $\phi(p)$ remains constant, so the system designer should be careful to ensure that the leak function does not reveal information allowing the attacker to find new useful information about $x_1 x_2$ mod $\phi(p)$.

There is a modest performance penalty, approximately a factor of four, for the leak-resistant design as described. One way to improve performance is to remove the blinding and unblinding operations, which are often unnecessary. (The blinding operations prevent attackers from correlating input values of y with the numbers processed by the modular exponentiation operation.) Alternatively or additionally, it is possible to update and reuse values of $b_0$, $b_3$, $r_1$, and $r_2$ by computing $b_0 \leftarrow (b_0)^v$ mod p, $b_3 \leftarrow (b_3)^v$ mod p, $r_1 \leftarrow (r_1)^w$ mod $\phi(p)$, and $r_2 \leftarrow (r_2)^w$ mod $\phi(p)$, where v and w are fairly short random exponents. Note that the relationship $b_3 \leftarrow b_0^{-x_1 x_2}$ mod p remains true when $b_0$ and $b_3$ are both raised to the power v (mod p). The relationship $r_2 = (r_1^{-1})$ mod $\phi(p)$ also remains true when $r_1$ and $r_2$ are exponentiated (mod $\phi(p)$). Other parameter update operations may also be used, such as exponentiation with fixed exponents (e.g., v=w=3), or multiplication with random values and their inverses, mod p and $\phi(p)$. The time per transaction with this update process is about half that of the unoptimized leak-resistant implementation, but additional storage is required and care should be taken to ensure that $b_0$, $b_3$, $r_1$, $r_2$ will not be leaked or otherwise compromised.

It should also be noted that with this particular type of certified Diffie-Hellman, the negotiated key is the same every time any given pair of users communicate. Consequently, though the blinding operation performed using $b_0$ and $b_3$ does serve to protect the exponents, the result K can be leaked in the final step or by the system after the process is complete. If storage is available, parties could keep track of the values of y they have received (or their hashes) and reject duplicates. Alternatively, to ensure that a different result is obtained from each negotiation, Alice and Bob can generate and exchange additional exponents, $w_{Alice}$ and $w_{Bob}$, for example with $0<w<2^{128}$ (where $2^{128}<<p$). Alice sets $y=(y_{BA})^{w_{Alice}w_{Bob}}$ mod p instead of just $y=y_{BA}$, and Bob sets $y=(y_{AB})^{w_{Bob}w_{Alice}}$ mod p instead of $y=y_{AB}$ before performing the operation shown in FIG. 2.

B. Leak-Resistant RSA

Another asymmetric cryptographic protocol is RSA, which is widely used for digital signatures and public key encryption. RSA private key operations rely on secret exponents. If information about these secret exponents leaks from an implementation, its security can be compromised. Consequently, a leak-resistant implementation of RSA would be useful.

To give RSA private key operations resistance to leaks, it is possible to divide the secret exponent into two halves such that information about either half is destroyed with each operation. These are two kinds of RSA private key operations. The first, private key signing, involves signing a message with one's own private key to produce a digital signature verifiable by anyone with one's corresponding public key. RSA signing operations involve computing $S=M^d$ mod n, where M is the message, S is the signature (verifiable using $M=S^e$ mod n), d is the secret exponent and equals $e^{-1}$ mod $\phi(n)$, and n is the modulus and equals pq, where n and e are public and p and q are secret primes, and $\phi$ is Euler's phi finction. An RSA public key consists of e and n, while an RSA private key consists of d and n (or other representations of them). For RSA to be secure, d, $\phi(n)$, p, and q should all be secret.

The other RSA operation is decryption, which is used to recover messages encrypted using one's public key. RSA decryption is virtually identical to signing, since the decrypted message M is recovered from the ciphertext C by computing $M=C^d$ mod n, where the ciphertext C was produced by computing $C=M^e$ mod n. Although the following discussion uses variable names from the RSA signing operation, the same techniques may be applied similarly to decryption.

Figure 3:
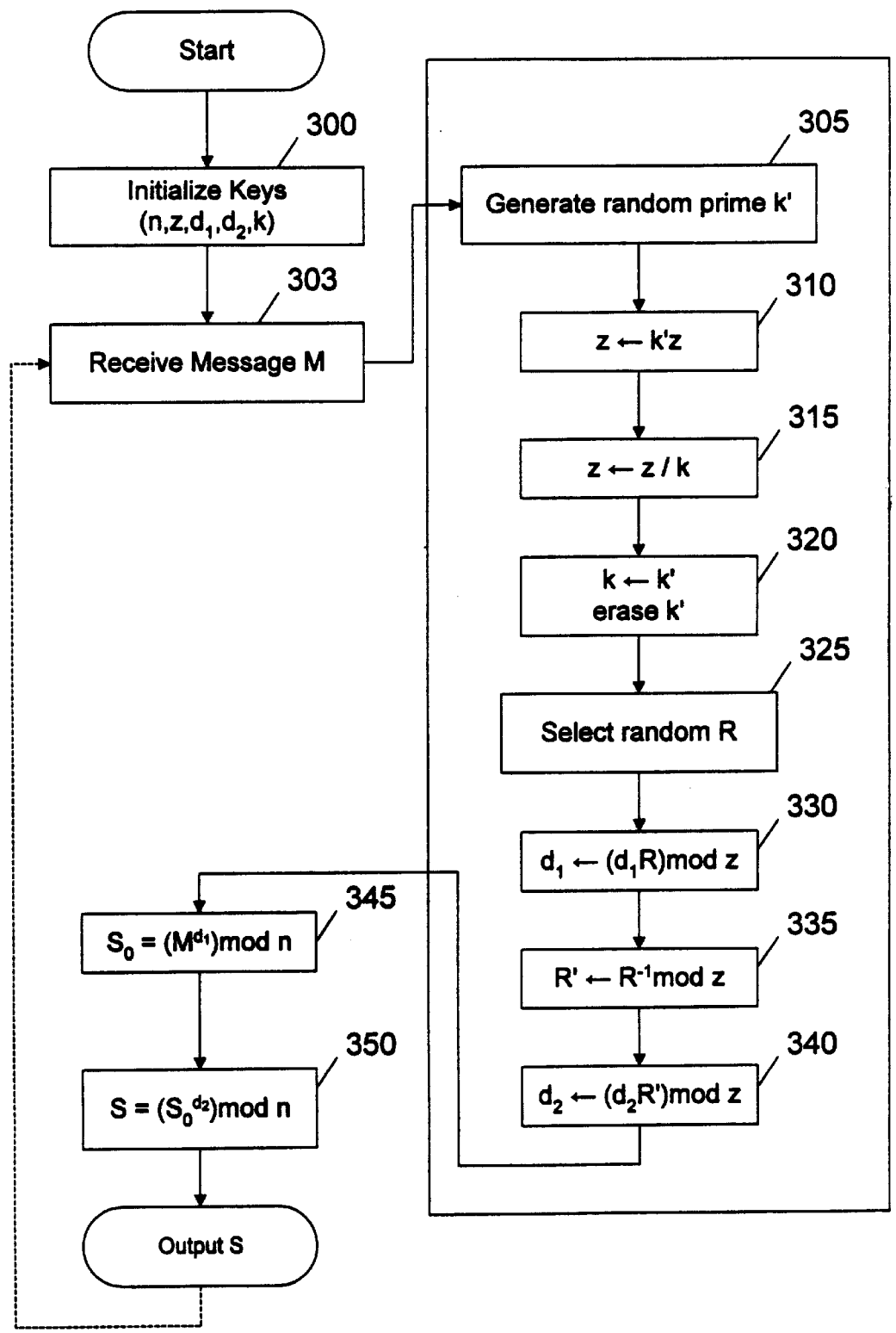
FIG. 3 shows an exemplary leak-resistant RSA private key operation.

An exemplary leak-resistant scheme for RSA implementations may be constructed as illustrated in FIG. 3. At step 300, prior to the commencement of any signing or decryption operations, the device is initialized with (or creates) the public and private keys. The device contains the public modulus n and the secret key components $d_1$, $d_2$, and z, and k, where k is a prime number of medium-size (e.g., $0<k<2^{128}$) chosen at random, $z=k\phi(n)$, $d_1$ is a random number such that $0<d_1<z$ and $\gcd(d_1, z)=1$, and $d_2=(e^{-1}$ mod $\phi(n))(d_1^{-1}$ mod z) mod z. In this invention, $d_1$ and $d_2$ replace the usual RSA secret exponent d. Techniques for generating the initial RSA primes (e.g., p and q) and modulus (n) are well known in the background art. At step 305, the device computes a random prime k' of medium size (e.g., $0<k'<2^{128}$). (Algorithms for efficiently generating prime numbers are known in the art.)

At step 303, the device (token) receives a message M to sign (or to decrypt). At step 310, the device updates z by computing $z \leftarrow k'z$. At step 315, the device updates z again by computing $z \leftarrow z/k$. (There should be no remainder from this operation, since k divides z.) At step 320, k is replaced with k' by performing $k \leftarrow k'$. Because k' will not be used in subsequent operations, its storage space may be used to hold R (produced at step 325). At step 325, the device selects a random R where $0<R<z$ and $\gcd(R, z)=1$. At step 330, the device updates $d_1$ by computing $d_1 \leftarrow d_1 R$ mod z. At step 335, the device finds the inverse of R by computing $R' \leftarrow R^{-1}$ mod z using, for example, the extended Euclidean algorithm. Note that R is no longer needed after this step, so its storage space may be erased and used to hold R'. At step 340, the device updates $d_2$ by computing $d_2 \leftarrow d_2 R'$ mod z. At step 345, the device computes $S_0 = M^{d_1}$ mod n, where M is the input message to be signed (or the message to be decrypted). Note that M is no longer needed after this step, so its storage space may be used for $S_0$. At step 350, the device computes $S = S_0^{d_2}$ mod n, yielding the final signature (or plaintext if decrypting a message). Leak-resistant RSA has similar security characteristics as normal RSA; standard message padding, post-processing, and key sizes may be used. Public key operations are also performed normally (e.g., $M = S^e$ mod n).

A simpler RSA leak resistance scheme may be implemented by splitting the exponent d into two halves $d_1$ and $d_2$ such that $d_1 + d_2 = d$. This can be achieved during key generation by choosing $d_1$ to be a random integer where $0 < d_1 < d$, and choosing $d_2 \leftarrow d - d_1$. To perform private key operations, the device needs $d_1$ and $d_2$, but it does not need to contain d. Prior to each private key operation, the cryptographic device identifies which of $d_1$ and $d_2$ is larger. If $d_{1>d2}$, then the device computes a random integer r where $0 \leq r \leq d_1$, adds r to $d_2$ (i.e., $d_2 \leftarrow d_2 + r$), and subtracts r from $d_1$ (i.e., $d_1 \leftarrow d_1 - r$). Otherwise, if $d_1 \leq d_2$, then the device chooses a random integer r where $0 \leq r \leq d_2$, adds r to $d_1$ (i.e., $d_1 \leftarrow d_1 + r$), and subtracts r from $d_2$ (i.e., $d_2 \leftarrow d_2 - r$). Then, to perform the private key operation on a message M, the device computes $s_1 = M^{d_1}$ mod n, $s_2 = M^{d_2}$ mod n, and computes the signature $S = s_1 s_2$ mod n. While this approach of splitting the exponent into two halves whose sum equals the exponent can also be used with Diffie-Hellman and other cryptosystems, dividing the exponent into the product of two numbers mod $\phi(p)$ is usually preferable since the assumption that information about $d_1 + d_2$ will not leak is less conservative than the assumption that information about $x_1 x_2$ mod $\phi(p)$ will not leak. In the case of RSA, updates mod $\phi(n)$ cannot be done safely, since $\phi(n)$ must be kept secret.

When the Chinese Remainder Theorem is required for performance, it is possible to use similar techniques to add leak resistance by maintaining multiples of the secret primes (p and q) that are updated every time (e.g., multiplying by the new multiple then dividing by the old multiple). These techniques also protect the exponents ($d_p$ and $d_q$) as multiples of their normal values. At the end of the operation, the result S is corrected to compensate for the adjustments to $d_p$, $d_q$, p, and q.

An exemplary embodiment maintains state information consisting of the values n, $B_i$, $B_f$, k, $p_k$, $q_k$, $d_{pk}$, $d_{qk}$, $P_{Inv}$, and f. To convert a traditional RSA CRT private key (consisting of p, q, $d_p$, and $d_q$ with $p<q$) into the new representation, a random value for k is chosen, where $0<k<2^{64}$. The value $B_i$ is chosen at random where $0<B_i<n$, and $R_1$ and $R_2$ are chosen at random where $0<R_1<2^{64}$ and $0<R_2<2^{64}$. (Of course, constants such as $2^{64}$ are chosen as example values. It is possible, but not necessary, to place constraints on random numbers, such as requiring that they be prime.) The leak-resistant private key state is then initialized by setting $n \leftarrow pq$, $B_f \leftarrow B_i^{-d}$ mod n, $p_k \leftarrow (k)(p)$, $q_k \leftarrow (k)(q)$, $d_{pk} \leftarrow d_p + (R_1)(p) - R_1$, $d_{qk} \leftarrow d_q + (R_2)(q) - R_2$, $P_{Inv} \leftarrow k(p^{-1} \text{mod } q)$, and $f \leftarrow 0$.

To update the system state, first a random value $\alpha$ may be produced where $0 < \alpha < 2^{64}$. Then compute $p_k \leftarrow ((\alpha)(p_k))/k$, $q_k \leftarrow ((\alpha)(q_k))/k$, $P_{Inv} \leftarrow ((\alpha)(P_{Inv}))/k$, $k \leftarrow \alpha$ The exponents $d_{pk}$ and $d_{qk}$ may be updated by computing $d_{pk} \leftarrow d_{pk} \pm (R_3 p_{-R3} k)$ and $d_{qk} \leftarrow d_{qk} \pm (R_4 q_k - R_4 k)$, where $R_3$ and $R_4$ can be random or constant values (even 1). The blinding factors $B_i$ and $B_f$ may be updated by computing $B_i = B_i^2$ mod n and $B_f = B_f^2$ mod n, by computing new blinding factors, by exponentiating with a value other than 2, etc. Update processes should be performed as often as practical, for example before or after each modular exponentiation process. Before the update begins, a failure counter f is incremented, and when the update completes f is set to zero. If f ever exceeds a threshold value indicating too many consecutive failures, the device should temporarily or permanently disable itself. Note that if the update process is interrupted, memory values should not be left in intermediate states. This can be done by using complete reliable memory updates. If the total set of variable changes is too large for a single complete update, it is possible to store α first then do each variable update reliably which keeping track of how many have been completed.

To perform a private key operation (such as decryption or signing), the input message C is received by the modular exponentiator. Next, the value is blinded by computing $C' \leftarrow (C)(B_i)$ mod n. The blinded input message is then used to compute modified CRT intermediates by computing $m_{pk} \leftarrow (C')^{d_{pk}}$ mod $p_k$ and $m_{qk} \leftarrow (C')^{d_{qk}}$ mod $q_k$. Next in the exemplary embodiment, the CRT intermediates are multiplied by k, e.g. $m_{pk} \leftarrow (k)(m_{pk})$ mod $p_k$ and $m_{qk} \leftarrow (k)(m_{qk})$ mod qk. The CRT difference is then computed as $m_{pqk} = (m_{pk} [+q_k] - m_{qk})$ [mod $q_k$], where the addition of $q_k$ and/or reduction mod $q_k$ are optional. (The addition of $q_k$ ensures that the result is non-negative.) The blinded result can be computed as $$M' = \frac{(m_{pk})k + p_k \left\{ \frac{(p_{Inv})(m_{pqk})}{k} \mod q_k \right\}}{k^2},$$

As one of ordinary skill in the art will appreciate, variant forms of the invention are possible. For example, the computational processes can be re-ordered or modified without significantly changing the invention. Some portions (such as the initial and blinding steps) can be skipped. In another example, it is also possible to use multiple blinding factors (for example, instead of or in addition to the value k).

In some cases, other techniques may also be appropriate. For example, exponent vector codings may be rechosen frequently using, for example, a random number generator. Also, Montgomery arithmetic may be performed mod j where j is a value that is changed with each operation (as opposed to traditional Montgomery implementations where j is constant with $j=2^k$). The foregoing shows that the method and apparatus of the present invention can be implemented using numerous variations and modifications to the exemplary embodiments described herein, as would be known by one skilled in the art.

C. Leak-Resistant ElGamal Public Key Encryption and Digital Signatures

Still other asymmetric cryptographic protocols that may be improved using the techniques of the invention. For example, ElGamal and related cryptosystems are widely used for digital signatures and public key encryption. If information about the secret exponents and parameters leaks from an ElGamal implementation, security can be compromised. Consequently, leak-resistant implementations of ElGamal would be useful.

The private key in the ElGamal public key encryption scheme is a randomly selected secret α where $1 \leq \alpha \leq p-2$. The non-secret parameters are a prime p, a generator α, and $\alpha^\alpha$ mod p. To encrypt a message m, one selects a random k (where $1 \leq k \leq p-2$) and computes the ciphertext (γ, δ) where $\gamma = \alpha^k$ mod p and $\delta = m(\alpha^\alpha \mod p)^k$ mod p. Decryption is performed by computing $m = \delta(\gamma^{p-1-\alpha})$ mod p. (See the *Handbook of Applied Cryptography* by A. Menezes, P. van Oorschot, and S. Vanstone, 1997, pages 294–298, for a description of ElGamal public-key encryption).

To make the ElGamal public-key decryption process leak-resistant, the secret exponent $(p-1-\alpha)$ is stored in two halves $\alpha_1$ and $\alpha_2$, such that $\alpha_1 \alpha_2 = (\phi(p) - \alpha)$ mod $\phi(p)$.

When generating ElGamal parameters for this leak-resistant implementation, it is recommended, but not required, that p be chosen with $(p-1)/2$ prime so that $\phi(p)/2$ is prime.

The variables $\alpha_1$ and $\alpha_2$ are normally chosen initially as random integers between 0 and $\phi(p)$. Alternatively, it is possible to generate α first, then choose $\alpha_1$ and $\alpha_2$, as by selecting $\alpha_1$ relatively prime to $\phi(p)$ and computing $\alpha_2 = (\alpha^{-1} \mod \phi(p))(\alpha_1^{-1} \mod \phi(p))$ mod $\phi(p)$.

Figure 4:
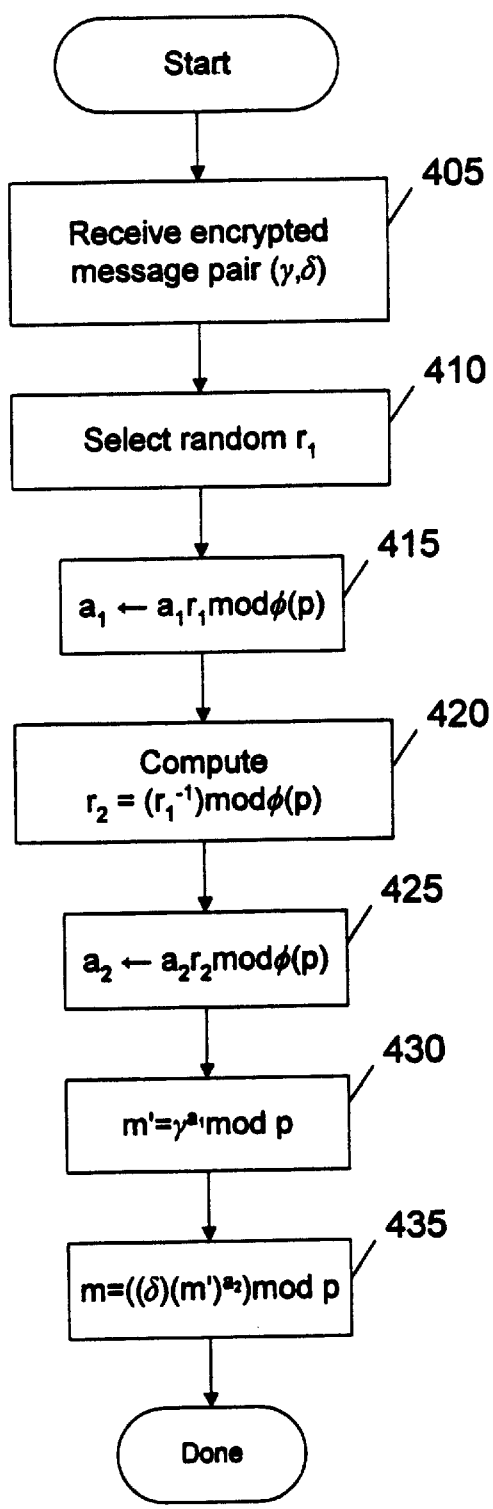
FIG. 4 shows an exemplary leak-resistant ElGamal signing operation.

FIG. 4 illustrates an exemplary leak-resistant ElGamal decryption process. At step 405, the decryption device receives an encrypted message pair (γ, δ). At step 410, the device selects a random $r_1$ where $1 \leq r_1 \leq \phi(p)$ and $\gcd(r_1, \phi(p)) = 1$. At step 415, the device updates $\alpha_1$ by computing $\alpha \leftarrow \alpha_1 r_1$, mod $\phi(p)$, over-writing the old value of $\alpha_1$ with the new value. At step 420, the device computes the inverse of $r_1$ by computing $r_2 = (r_1)^{-1}$ mod $\phi(p)$. Because $r_1$ is not used after this step, its storage space may be used to hold $r_2$. Note that if $(p-1)/2$ is prime, then $r_2$ may also be found by finding $r_2' = r_1^{(P-1)/2-2}$ mod $(p-1)/2$ and using the CRT to find $r_2$ (mod $p-1$). At step 425, the device updates $a_2$ by computing $a_2 \leftarrow a_2 r_2$ mod $\phi(p)$. At step 430, the device begins the private key (decryption) process by computing $m' = \gamma^{\alpha_1}$ mod p. At step 435, the device computes $m = \delta(m')^{\alpha_2}$ mod p and returns the message m. If verification is successful, the result equals the original message because:

$$(\delta)(m')^{a_2} \mod p = (m(\alpha^a)^k)(\gamma^{a_1} \mod p)^{a_2} \mod p$$
$$= (m\alpha^{ak})(\gamma^{a_1 a_2 \mod \phi(p)}) \mod p$$
$$= (m\alpha^{ak})((\alpha^k \mod p)^{-a \mod \phi(p)}) \mod p$$
$$= (m\alpha^{ak})(\alpha^{-ak}) \mod p$$
$$= m$$

As with the ElGamal public key encryption scheme, the private key for the ElGamal digital signature scheme is a randomly-selected secret α, where $1 \leq \alpha \leq p-2$. The public key is also similar, consisting of a prime p, a generator α, and public parameter y where $y = \alpha^\alpha$ mod p. To sign a message m, the private key holder chooses or precomputes a random secret integer k (where $1 \leq k \leq p-2$ and k is relatively prime to $p-1$) and its inverse, $k^{-1}$ mod $\phi(p)$. Next, the signer computes the signature (r, s), where $r = \alpha^k$ mod p, $s = ((k^{-1} \mod \phi(p))[H(m) - \alpha r]) \mod \phi(p)$, and $H(m)$ is the hash of the message. Signature verification is performed using the public key (p, α, y) by verifying that $1 \leq r \leq p$ and by verifying that $y^r r^s \mod p = \alpha^{H(m)}$ mod p.

To make the ElGamal digital signing process leak-resistant, the token containing the private key maintains three persistent variables, $\alpha_k$, w, and r. Initially, $\alpha a_k = \alpha$ (the private exponent), $w=1$, and $r=\alpha$. When a message m is to be signed (or during the precomputation before signing), the token generates a random number b and its inverse $b^{-1}$ mod $\phi(p)$, where b is relatively prime to $\phi(p)$ and $0 < b < \phi(p)$. The token then updates $a_k$, w, and r by computing $a_k \leftarrow (a_k)(b^{-1})$ mod $\phi(p)$, $w \leftarrow (w)(b^{-1})$ mod $\phi(p)$, and $r \leftarrow (r^b)$ mod p. The signature (r, s) is formed from the updated value of r and s, where $s = (w(H(m) - a_k r)) \mod \phi(p)$. Note that $a_k$, w, and r are not randomized prior to the first operation, but should be randomized before exposure to possible attack, since otherwise the first operation may leak more information than subsequent ones. It is thus recommended that a dummy signature or parameter update with $a_k \leftarrow (a_k)(b^{-1})$ mod $\phi(p)$, $w \leftarrow (w)(b^{-1})$ mod $\phi(p)$, and $r \leftarrow (r^b)$ mod $p$ be performed immediately after key generation. Valid signatures produced using the exemplary tamper-resistant ElGamal process may be checked using the normal ElGamal signature verification procedure.

It is also possible to split all or some the ElGamal variables into two halves as part of the leak resistance scheme. In such a variant, $\alpha$ is replaced with $\alpha_1$ and $\alpha_2$, w with $w_1$ and $w_2$, and r with $r_1$ and $r_2$. It is also possible to reorder the operations by performing, for example, the parameter updates as a precomputation step prior to receipt of the enciphered message. Other variations and modifications to the exemplary embodiments described herein will be evident to one skilled in the art.

D. Leak-Resistant DSA

Another commonly used asymmetric cryptographic protocol is the Digital Signature Algorithm (DSA, also known as the Digital Signature Standard, or DSS), which is defined in "Digital Signature Standard (DSS)," Federal Information Processing Standards Publication 186, National Institute of Standards and Technology, May 19, 1994 and described in detail in the *Handbook of Applied Cryptography*, pages 452 to 454. DSA is widely used for digital signatures. If information about the secret key leaks from a DSA implementation, security can be compromised. Consequently, leak-resistant implementations of DSA would be useful.

In non-leak-proof systems, the private key consists of a secret parameter $\alpha$, and the public key consists of (p, q, $\alpha$, y), where p is a large (usually 512 to 1024 bit) prime, q is a 160-bit prime, $\alpha$ is a generator of the cyclic group of order q mod p, and $y = \alpha^\alpha$ mod p. To sign a message whose hash is H(m), the signer first generates (or precomputes) a random integer k and its inverse $k^{-1}$ mod q, where 0<k<q. The signer then computes the signature (r, s), where $r = (\alpha^k \mod p) \mod q$, and $s = (k^{-1} \mod q)(H(m) + \alpha r) \mod q$.

In an exemplary embodiment of a leak-resistant DSA signing process, the token containing the private key maintains two variables in nonvolatile memory, $a_k$ and k, which are initialized with $a_k = \alpha$ and k=1. When a message m is to be signed (or during the precomputation before signing), the token generates a random integer b and its inverse $b^{-1}$ mod q, where 0 <b<q. The token then updates $a_k$ and k by computing $a_k \leftarrow (a_k b^{-1} \mod q)(k) \mod q$, followed by $k \leftarrow b$. The signature (r, s) is formed from the updated values of $a_k$ and k by computing $r = \alpha^k \mod p$ (which may be reduced mod q), and $s = [(b^{-1} H(m) \mod q) + (a_k r) \mod q] \mod q$. As indicated, when computing s, $b^{-1} H(m) \mod q$ and $(a_k r) \mod q$ are computed first, then combined mod q. Note that $a_k$ and k should be randomized prior to the first operation, since the first update may leak more information than subsequent updates. It is thus recommended that a dummy signature (or parameter update) be performed immediately after key generation. Valid signatures produced using the leak-resistant DSA process may be checked using the normal DSA signature verification procedure.

IV. Other Algorithms and Applications

Still other cryptographic processes can be made leak-proof or leak-resistant, or may be incorporated into leak-resistant cryptosystems. For example, cryptosystems such as those based on elliptic curves (including elliptic curve analogs of other cryptosystems), secret sharing schemes, anonymous electronic cash protocols, threshold signatures schemes, etc. be made leak resistant using the techniques of the present invention.

Implementation details of the schemes described may be adjusted without materially changing the invention, for example by re-ordering operations, inserting steps, substituting equivalent or similar operations, etc. Also, while new keys are normally generated when a new system is produced, it is often possible to add leak resistance retroactively while maintaining or converting existing private keys.

Leak-resistant designs avoid performing repeated mathematical operations using non-changing (static) secret values, since they are likely to leak out. However, in environments where it is possible to implement a simple function (such as an exclusive OR) that does not leak information, it is possible use this finction to implement more complex cryptographic operations.

While the exemplary implementations assume that the leak functions can reveal any information present in the system, designers may often safely use the (weaker) assumption that information not used in a given operation will not be leaked by that operation. Schemes using this weaker assumption may contain a large table of precomputed subkey values, from which a unique or random subset are selected and/or updated for each operation. For example, DES implementations may use indexed permutation lookup tables in which a few table elements are exchanged with each operation.

While leak resistance provides many advantages, the use of leak resistance by itself cannot guarantee good security. For example, leak-resistant cryptosystems are not inherently secure against error attacks, so operations should be verified. (Changes can even be made to the cryptosystem and/or leak resistance operations to detect errors.) Similarly, leak resistance by itself does not prevent attacks that extract the entire state out of a device (e.g., $L=L_{MAX}$). For example, traditional tamper resistance techniques may be required to prevent attackers from staining ROM or EEPROM memory cells and reading the contents under a microscope. Implementers should also be aware of interruption attacks, such as those that involve disconnecting the power or resetting a device during an operation, to ensure that secrets will not be compromised or that a single leaky operation will not be performed repeatedly. (As a countermeasure, devices can increment a counter in nonvolatile memory prior to each operation, and reset or reduce the counter value when the operation completes successfully. If the number of interrupted operations since the last successful update exceeds a threshold value, the device can disable itself.) Other tamper resistance mechanisms and techniques, such as the use of fixed-time and fixed-execution path code or implementations for critical operations, may need to be used in conjunction with leak resistance, particularly for systems with a relatively low self-healing rate (e.g., $L_{MAX}$ is small).

Leak-resistant algorithms, protocols, and devices may be used in virtually any application requiring cryptographic security and secure key management, including without limitation: smartcards, electronic cash, electronic payments, funds transfer, remote access, timestamping, certification, certificate validation, secure e-mail, secure facsimile, telecommunications security (voice and data), computer networks, radio and satellite communications, infrared communications, access control, door locks, wireless keys, biometric devices, automobile ignition locks, copy protection devices, payment systems, systems for controlling the use and payment of copyrighted information, and point of sale terminals.

The foregoing shows that the method and apparatus of the present invention can be implemented using numerous variations and modifications to the exemplary embodiments described herein, as would be known by one skilled in the art. Thus, it is intended that the scope of the present invention be limited only with regard to the claims below.

What is claimed is:

1. A cryptographic token configured to perform cryptographic operations using a secret key in a secure manner, comprising:
   (a) an interface configured to receive power from a source external to said token;
   (b) a memory containing said secret key;
   (c) a processor:
      (i) configured to receive said power delivered via said interface;
      (ii) configured to perform said processing using said secret key from said memory;
   (d) said token having a power consumption characteristic:
      (i) that is externally measurable; and
      (ii) that varies over time in a manner measurably correlated with said cryptographic operations; and
   (e) a source of unpredictable information configured for use in said cryptographic operations to make determination of said secret key infeasible from external measurements of said power consumption characteristic.

2. The cryptographic token of claim 1, in the form of a secure microprocessor.

3. The cryptographic token of claim 1, in the form of a smart card.

4. The cryptographic token of claim 3, wherein said cryptographic operations performed by said smart card enable a holder thereof to decrypt an encrypted communication received via a computer network.

5. The cryptographic token of claim 3, wherein said smart card is configured to store value in an electronic cash scheme.

6. The cryptographic token of claim 5, wherein said cryptographic operations include authenticating that a balance of said stored value has been decreased.

7. The cryptographic token of claim 1, wherein said cryptographic operations include asymmetric private key operations.

8. The cryptographic token of claim 7 wherein said cryptographic operations include exponential key agreement operations.

9. The cryptographic token of claim 7, wherein said cryptographic operations include DSA signing operations.

10. The cryptographic token of claim 7, wherein said cryptographic operations include ElGamal private key operations.

11. The cryptographic token of claim 7, wherein said asymmetric private key operations include RSA private key operations.

12. The cryptographic token of claim 11 wherein said private key operations include Chinese Remainder Theorem operations.

13. The cryptographic token of claim 1, wherein said cryptographic operations include symmetric encryption operations.

14. The cryptographic token of claim 1, wherein said cryptographic operations include symmetric decryption operations.

15. The cryptographic token of claim 1, wherein said cryptographic operations include symmetric authentication operations using said secret key.

16. The cryptographic token of claim 1, wherein said cryptographic operations include authenticating a payment.

17. The cryptographic token of claim 1, wherein said cryptographic operations include securing a broadcast communications signal.

18. The cryptographic token of claim 17, wherein said cryptographic operations include decrypting a satellite broadcast.

* * * * *